(12) United States Patent
Quaderer et al.

(10) Patent No.: US 10,883,872 B2
(45) Date of Patent: Jan. 5, 2021

(54) PLANT DETECTION SYSTEMS COMPRISING A PHOTODETECTOR HOUSING WITH A DETECTOR LENS AND AN APERTURE PLATE

(71) Applicant: Trimble Inc., Sunnyvale, CA (US)

(72) Inventors: James G. Quaderer, Sunnyvale, CA (US); Chao Y. Lee, Fremont, CA (US); Kenneth S. Bradley, Mountain View, CA (US); Kenneth R. Agur, San Jose, CA (US)

(73) Assignee: Trimble Inc., Sunnyvale, CA (US)

( * ) Notice: Subject to any disclaimer, the term of this patent is extended or adjusted under 35 U.S.C. 154(b) by 135 days.

(21) Appl. No.: 16/288,972

(22) Filed: Feb. 28, 2019

(65) Prior Publication Data

US 2020/0278242 A1 Sep. 3, 2020

(51) Int. Cl.
| | | |
|---|---|---|
| G01N 33/00 | (2006.01) | |
| G01J 1/04 | (2006.01) | |
| A01C 15/00 | (2006.01) | |
| A01M 21/04 | (2006.01) | |
| G01J 1/02 | (2006.01) | |
| G01J 1/44 | (2006.01) | |

(52) U.S. Cl.
CPC ............ *G01J 1/0437* (2013.01); *A01C 15/00* (2013.01); *A01M 21/043* (2013.01); *G01J 1/0271* (2013.01); *G01J 1/0411* (2013.01); *G01J 1/44* (2013.01)

(58) Field of Classification Search
CPC ....... G01N 2021/8466; G01N 21/3554; G01N 21/84; G01N 21/3151; G01N 33/0098; G01N 21/255; G01N 21/90; A01G 7/045; A01G 31/047; A01G 9/26; A01G 9/24; A01G 22/00; A01C 21/007
USPC ......................................... 250/216, 239, 221
See application file for complete search history.

(56) References Cited

U.S. PATENT DOCUMENTS

| | | |
|---|---|---|
| 5,296,702 A | 3/1994 | Beck et al. |
| 6,674,521 B1 * | 1/2004 | Segall ...................... G01B 9/10 356/138 |
| 2008/0019026 A1 | 1/2008 | Feng et al. |

OTHER PUBLICATIONS

Extended European Search Report for Application No. 20156855.7-1020, dated Jun. 26, 2020, 7 pages.

* cited by examiner

*Primary Examiner* — Que Tan Le
(74) *Attorney, Agent, or Firm* — Kilpatrick Townsend & Stockton LLP

(57) ABSTRACT

A plant detection system includes a radiation module and a photodetector system. The photodetector system includes a photodetector housing, one or more photodetectors, a detector lens, and an aperture plate. The aperture plate is disposed within the photodetector housing between the detector lens and the one or more photodetectors and has an aperture extending therethrough. The detector lens and the aperture plate are configured so that stray radiation received by the detector lens is directed through the aperture in the aperture plate or onto a surface of the aperture plate without being directed onto sidewalls of the photodetector housing.

20 Claims, 10 Drawing Sheets

PLANT DETECTION SYSTEMS COMPRISING A PHOTODETECTOR HOUSING WITH A DETECTOR LENS AND AN APERTURE PLATE

BACKGROUND

The spectral reflectance of plants compared to that of soil can be used to detect the presence of plants on the ground. This is illustrated in FIG. 1, which is an exemplary plot of the reflectance versus wavelength of a living plant 1 compared to that of bare soil 2. Due to the differences between the spectral reflectance characteristics, it is possible to differentiate the living plant 1 from the bare soil 2. For example, radiation beams of two different wavelengths can be transmitted toward the ground, and the intensities of the different wavelengths of scattered radiation returning from the ground can be compared to determine if there is a plant 1 or bare soil 2. This is because radiation at the different wavelengths is absorbed by the living plant 1 and the bare soil 2 differently. For example, the living plant 1 may mostly absorb radiation at wavelengths of between about 650 nm and 700 nm ($W_1$), and the living plant 1 may mostly reflect radiation at wavelengths above about 720 nm ($W_2$). In contrast, the bare soil 2 may have a similar reflectance at each of the wavelengths $W_1$, $W_2$.

Detecting plants in this manner allows herbicide sprayer systems to reduce the amount of chemicals required to eradicate weeds in a field. For example, a field may be scanned using radiation beams, and each time a plant is detected, a valve may be opened to spray herbicide on the plant. A considerable savings may be realized since the herbicide is not sprayed unnecessarily onto the bare soil.

Conventional plant detection systems generally include a radiation module and a photodetector system. The radiation module is for emitting radiation, and the photodetector system is for collecting radiation and generating electrical signals. Under normal operating conditions, the radiation collected by the photodetector system is reflected radiation. As explained previously, this is the method by which plants can be detected on the ground. When not in use, however, the plant detection systems may be placed in a position where sunlight or other radiation impinges on the photodetector system, and specifically on one or more detector lenses of the photodetector system.

This stray radiation may have a high intensity that can damage components of the photodetector system. Even if the intensity is not high, the stray radiation may be focused on components for an extended period of time. This can melt or damage electrical and optical components as well as the housing of the photodetector system. In some situations, the stray radiation may heat the components and/or housing and cause outgassing. The outgassing can coat the optical components with a film that reduces sensitivity of the plant detection system.

Improved systems are desired that reduce damage to plant detection systems by stray radiation.

SUMMARY

Embodiments described herein provide improved plant detection systems that reduce and/or prevent damage due to stray radiation. Stray radiation may be radiation from the sun or any other sources that is not generated by the system. In an embodiment, for example, a plant detection system includes an aperture plate disposed within a housing of a photodetector system. The aperture plate is disposed between a detector lens and one or more photodetectors. The detector lens and aperture plate are configured so that any stray radiation received by the detector lens is directed through an aperture in the aperture plate toward the one or more photodetectors or onto a surface of the aperture plate. The detector lens and aperture plate are configured so that the stray radiation is not directed directly onto any portion of the housing or other components that may be subject to thermal damage (e.g., electrical or optical components). The housing is typically made of plastic, and the aperture plate is typically made of metal or another material that can withstand the stray radiation that is focused by the detector lens. The aperture plate may also be configured to block the stray radiation from impinging directly on any other plastic parts and/or components. Depending on the embodiment, one or more of these features and/or benefits may exist.

In accordance with an embodiment, for example, a plant detection system includes a radiation module and a photodetector system. The radiation module is configured to emit a beam comprising radiation at a first wavelength and radiation at a second wavelength different from the first wavelength. The radiation at the first wavelength is modulated with a first signal having a first phase, and the radiation at the second wavelength is modulated with a second signal having a second phase different from the first phase. The photodetector system includes a photodetector housing, one or more photodetectors, a detector lens, and an aperture plate. The photodetector housing has sidewalls forming a cylindrical shape therebetween. The one or more photodetectors are disposed within the photodetector housing and are configured to receive reflected portions of the beam and generate an electrical signal based on the reflected portions of the beam. The detector lens is configured to direct the reflected portions of the beam onto at least one of the one or more photodetectors. The aperture plate is disposed within the photodetector housing between the detector lens and the one or more photodetectors. The aperture plate is free of plastic on a surface facing the detector lens and has an aperture extending through a center portion of the aperture plate. The surface of the aperture plate facing the detector lens extends between the sidewalls of the photodetector housing so that at least some outer edges of the aperture plate are adjacent to the sidewalls of the photodetector housing.

In an embodiment, at least some of the outer edges of the aperture plate abut the sidewalls of the photodetector housing.

In another embodiment, the aperture plate is coupled to the sidewalls of the photodetector housing.

In another embodiment, a portion of the aperture plate extends orthogonal to the sidewalls of the photodetector housing and a portion of the aperture plate extends parallel to the sidewalls of the photodetector housing.

In another embodiment, the photodetector housing includes one or more ledges extending inward from the sidewalls, and the aperture plate is coupled to the one or more ledges.

In another embodiment, the one or more photodetectors and the aperture plate are coupled to a substrate.

In another embodiment, the surface of the aperture plate facing the detector lens comprises metal.

In another embodiment, the photodetector housing comprises plastic and the aperture plate comprises metal.

In yet another embodiment, edges of the aperture form a polygon shape in the aperture plate.

In accordance with another embodiment, a plant detection system includes a radiation module and a photodetector system. The radiation module is configured to emit a beam of radiation. The photodetector system includes a photodetector housing, one or more photodetectors, a detector lens, and an aperture plate. The photodetector housing has sidewalls forming a cylindrical shape therebetween. The one or more photodetectors are disposed near a first end of the cylindrical shape and are configured to receive reflected portions of the beam of radiation and generate an electrical signal based on the received portions of the beam of radiation. The detector lens is disposed near a second end of the cylindrical shape opposite the first end and is configured to direct the reflected portions of the beam onto at least one of the one or more photodetectors. The aperture plate is disposed within the photodetector housing between the detector lens and the one or more photodetectors and has an aperture extending therethrough. A surface of the aperture plate facing the detector lens extends between the sidewalls of the photodetector housing so that at least some outer edges of the aperture plate are adjacent to the sidewalls of the photodetector housing.

In accordance with yet another embodiment, a plant detection system includes a radiation module configured to emit a beam of radiation and a photodetector system. The photodetector system includes a photodetector housing, one or more photodetectors, a detector lens, and an aperture plate. The photodetector housing has sidewalls extending between a first end of a housing and a second end of the housing. The one or more photodetectors are disposed near a first end of the housing and are configured to receive reflected portions of the beam of radiation and generate an electrical signal based on the received portions of the beam of radiation. The detector lens is disposed near a second end of the housing opposite the first end and is configured to direct the reflected portions of the beam onto at least one of the one or more photodetectors. The aperture plate is disposed within the photodetector housing between the detector lens and the one or more photodetectors and has an aperture extending therethrough. The detector lens and the aperture plate are configured so that stray radiation received by the detector lens is directed through the aperture in the aperture plate or onto a surface of the aperture plate without being directed onto the sidewalls of the photodetector housing.

In an embodiment, the aperture plate is shaped to prevent the stray radiation focused by the detector lens from impinging directly on the sidewalls of the photodetector housing.

These and other features are described throughout the specification with reference to the appended drawings.

DETAILED DESCRIPTION

Embodiments described herein provide improved plant detection systems that reduce and/or prevent damage due to stray radiation. An aperture plate is disposed between a detector lens and one or more photodetectors of a photodetector system. The aperture plate is used to prevent the stray radiation from impinging directly on a housing of the photodetector system. A surface of the aperture plate may be dulled to reduce intensity of any radiation reflected from the surface. The aperture plate has an aperture to allow radiation to reach the one or more photodetectors. The aperture plate may be shaped to protect parts of the housing and/or other components that may be subject to the stray radiation.

Figure 1:
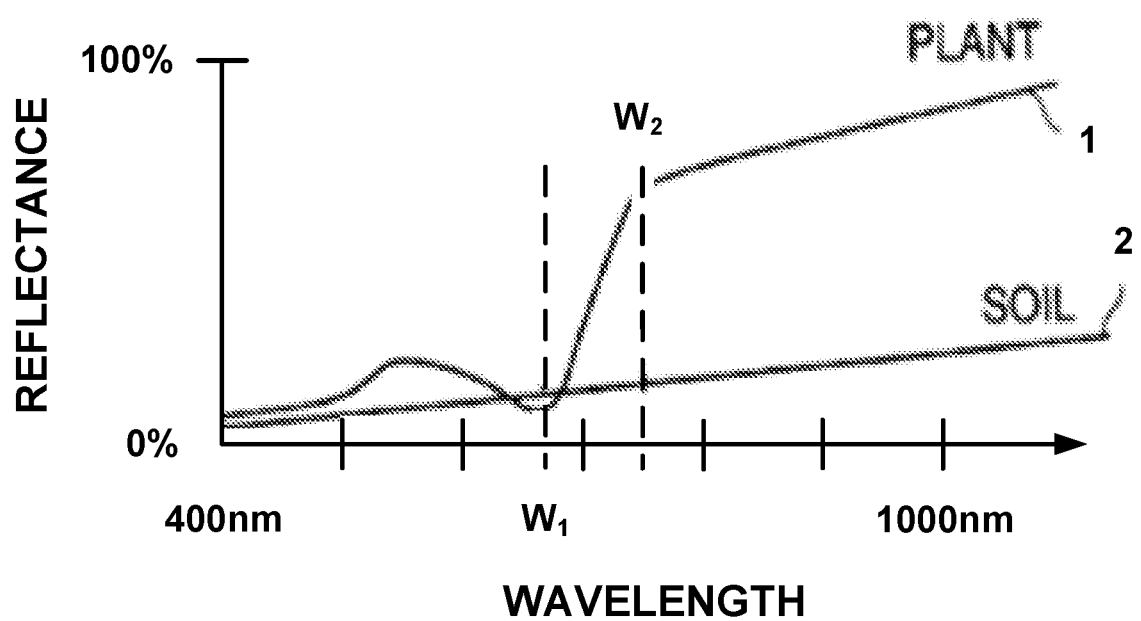
FIG. 1 is an exemplary plot illustrating the spectral reflectance of a plant compared to that of soil.
Figure 2:
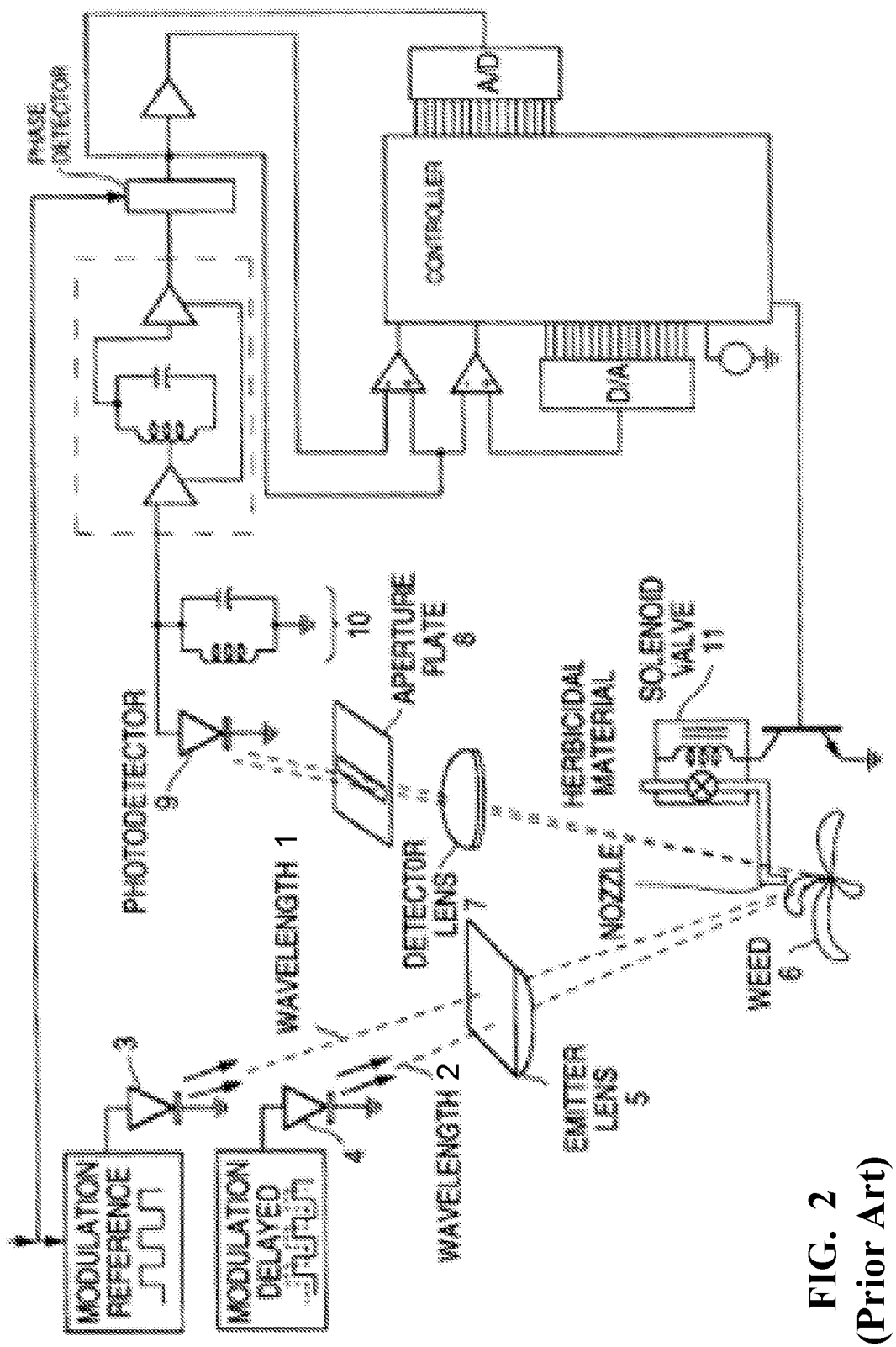
FIG. 2 is a simplified schematic diagram of an exemplary herbicide sprayer system.

FIG. 2 is a simplified schematic diagram of an exemplary herbicide sprayer system that may benefit from the embodiments described herein. The herbicide sprayer system is used merely as an example, and it should be appreciated that the embodiments described herein may be used with other types of chemical sprayer systems.

In the herbicide sprayer system shown in FIG. 2, a first diode 3 emits radiation at a first wavelength and a second diode 4 emits radiation at a second wavelength. In this example, the drive currents of the diodes 3, 4 are each modulated with respective modulation signals that are of the same frequency but different phase. The radiation from the diodes 3, 4 passes through an emitter lens 5 and is directed toward an object on the ground (in this case a weed 6). Some of the radiation impinging on the weed 6 is reflected and passes through a detector lens 7 and an aperture plate 8 before impinging on a photodetector 9. A resonant circuit 10 is tuned to the frequency of the modulation signals.

The phase of the scattered radiation impinging upon the photodetector 9 is used to assess the spectral reflectance characteristics of the scattered radiation and therefore to characterize the object (e.g., the weed 6 on the ground) from which the radiation is scattered. For example, if the radiation from the diode 4 was completely absorbed by the weed 6, then the only radiation received by the photodetector 9 would be from the diode 3. The photodetector 9 would therefore be modulated with a signal approximately in phase with the modulation signal driving the diode 3.

If, on the other hand, no radiation from the diode 3 was scattered by the weed 6, then the only radiation received by the photodetector 9 would be from the diode 4. Consequently, the oscillation induced in resonant circuit 10 would have a second phase relationship with respect to the phase of the modulation signal used to drive the diode 3.

The foregoing example represent extreme cases. In practice, the photodetector 9 typically receives some radiation from each of the diodes 3, 4. Then, depending on the relative reflectance values, the phase of the resonant circuit 10 is between the first and second extreme phase relationships described above.

A phase detector detects the phase of the oscillation induced in resonant circuit 10, providing phase information indicative of the relative strengths of the scattered radiation beams from the diodes 3, 4. If this phase information is consistent with the spectral reflectance characteristic of a plant, then a solenoid valve 11 is opened to spray herbicide onto the weed 6. Conversely, if the phase information is consistent with the spectral reflectance characteristic of soil, the solenoid valve 11 remains closed.

It should be appreciated that the schematic diagram shown in FIG. 2 depicts an exemplary herbicide sprayer system. The embodiments described herein are not limited to this system, and they may be implemented in other systems that may include different and/or additional components. As examples, some systems may utilize time-division multiplexing of the radiation at the different wavelengths, or other systems may separate the radiation into different channels using optical filters, rather than using the phase shift technique described with regard to FIG. 2. Also, some systems may utilize radiation at only one wavelength or at more than two different wavelengths.

Figure 3:
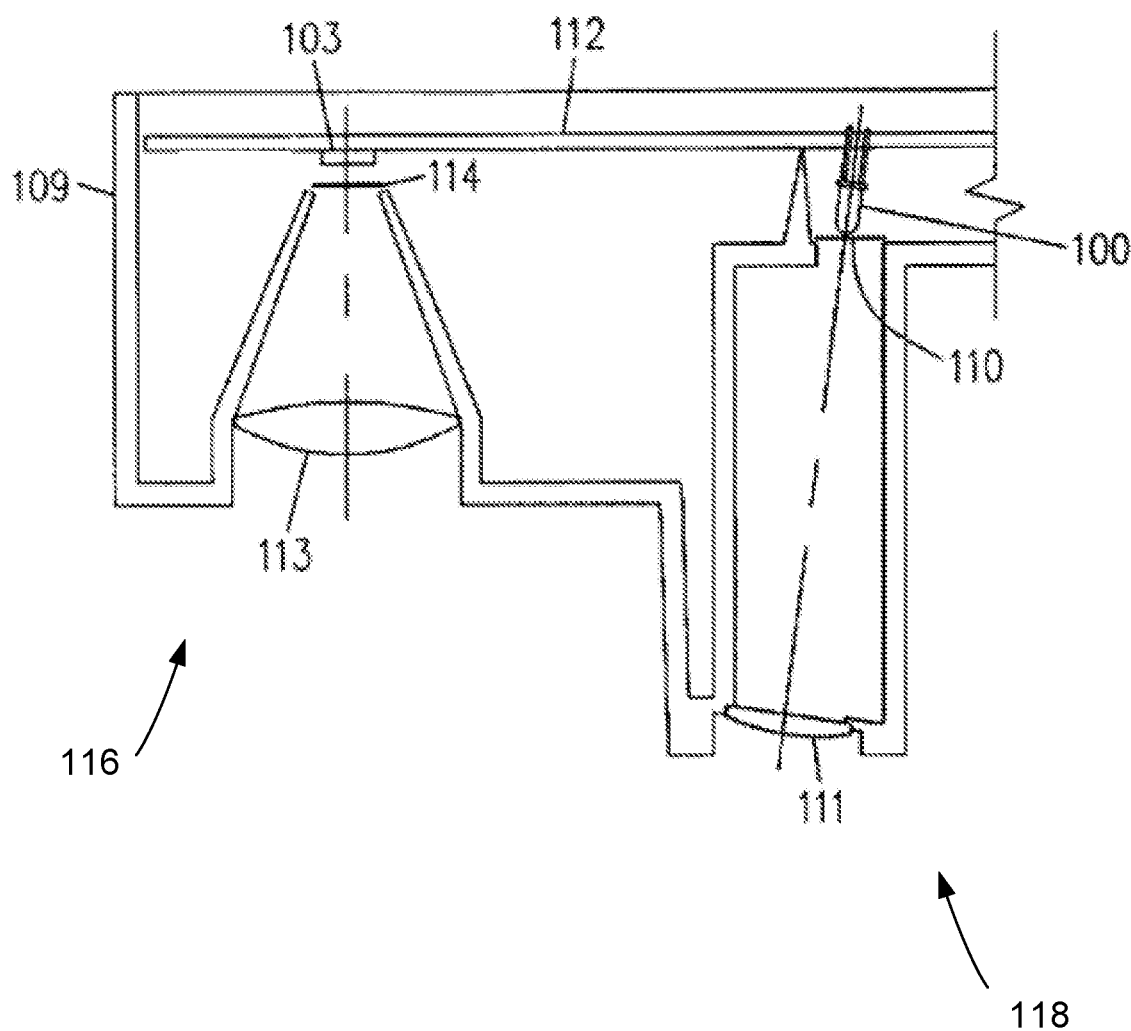
FIG. 3 is a simplified cross-sectional view of a portion of an exemplary plant detection system.

FIG. 3 is a simplified cross-sectional view of a portion of an exemplary plant detection system. The portion shown in this figure includes some components for detecting the presence of plants on the ground such as a radiation module 118 and a photodetector system 116. The radiation module 118 includes one or more diodes 100 (e.g., light emitting diodes), an emitter mask 110, and an emitter lens 111. The photodetector system 116 includes a detector lens 113, an aperture plate 114, and one or more photodetectors 103. A housing 109 surrounds the radiation module 118 and the photodetector system 116. The one or more photodetectors 103 are coupled to a printed circuit board 112.

The radiation module 118 is configured to emit radiation as discussed previously (e.g., $W_1$, $W_2$). Portions of the emitted radiation are reflected by plants and/or bare soil. Reflected portions of the light are received at the photodetector system 116, and signals from the photodetector 103 may be used to detect the presence of the plants on the ground.

FIG. 3 does not specifically show all the circuitry and/or hardware components for performing functions such as generating the radiation, detecting the radiation, analyzing the spectral reflectance characteristics, and controlling valves associated with a sprayer system.

In actual implementations, a plurality of the plant detection systems may be arranged adjacent to each other on an implement that forms a herbicide sprayer system and is coupled to a tractor or another vehicle. A height of the plant detection systems above the ground may be adjusted to provide nearly full coverage of the ground under the implement. In some arrangements, the light beams emitted from the plant detection systems have little to no overlap on the ground to avoid detection and double spraying of plants by adjacent systems.

Figure 4:
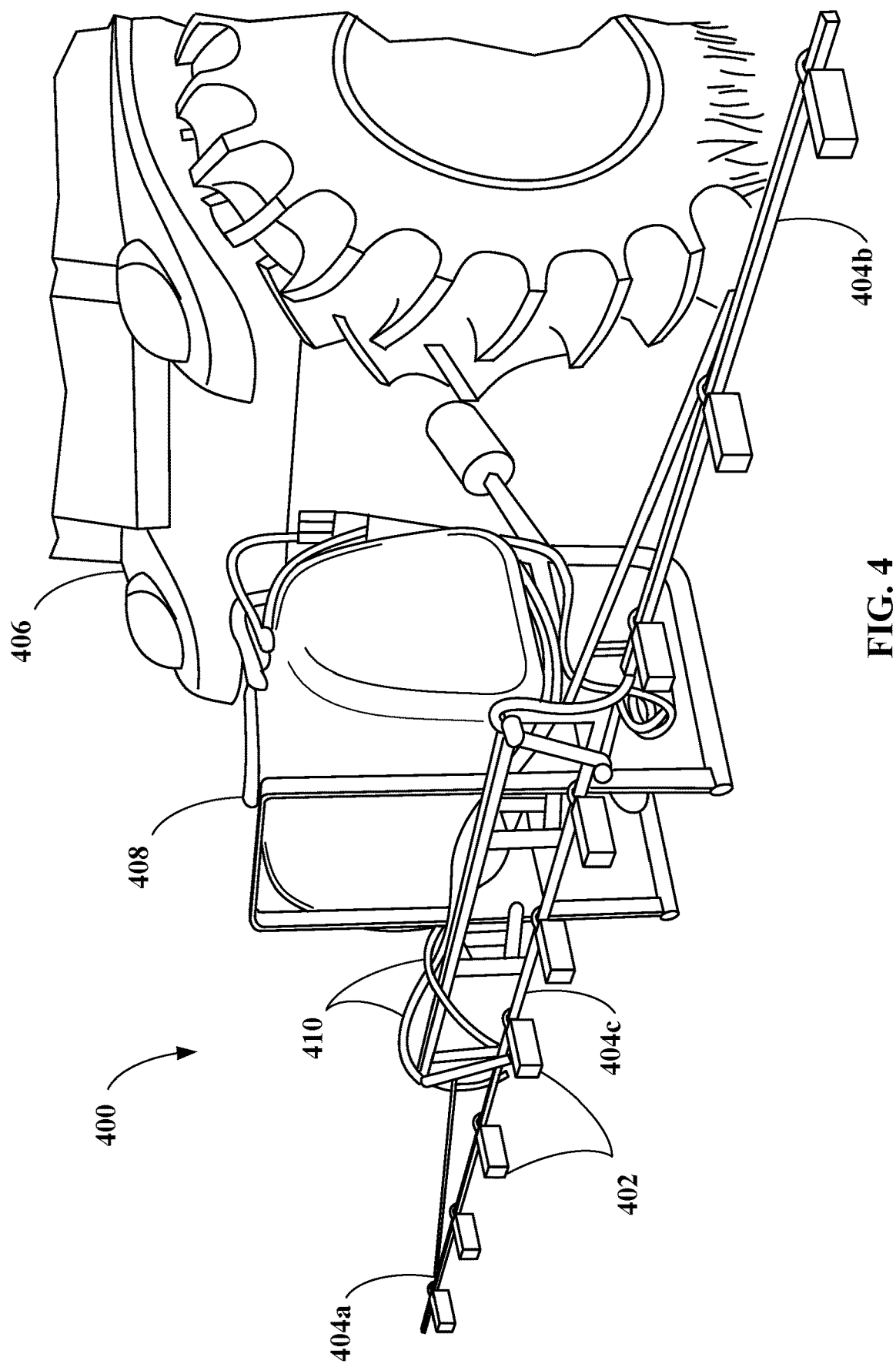
FIGS. 4-5 are simplified drawings showing part of a tractor with a herbicide sprayer that includes a number of plant detection systems.
Figure 5:
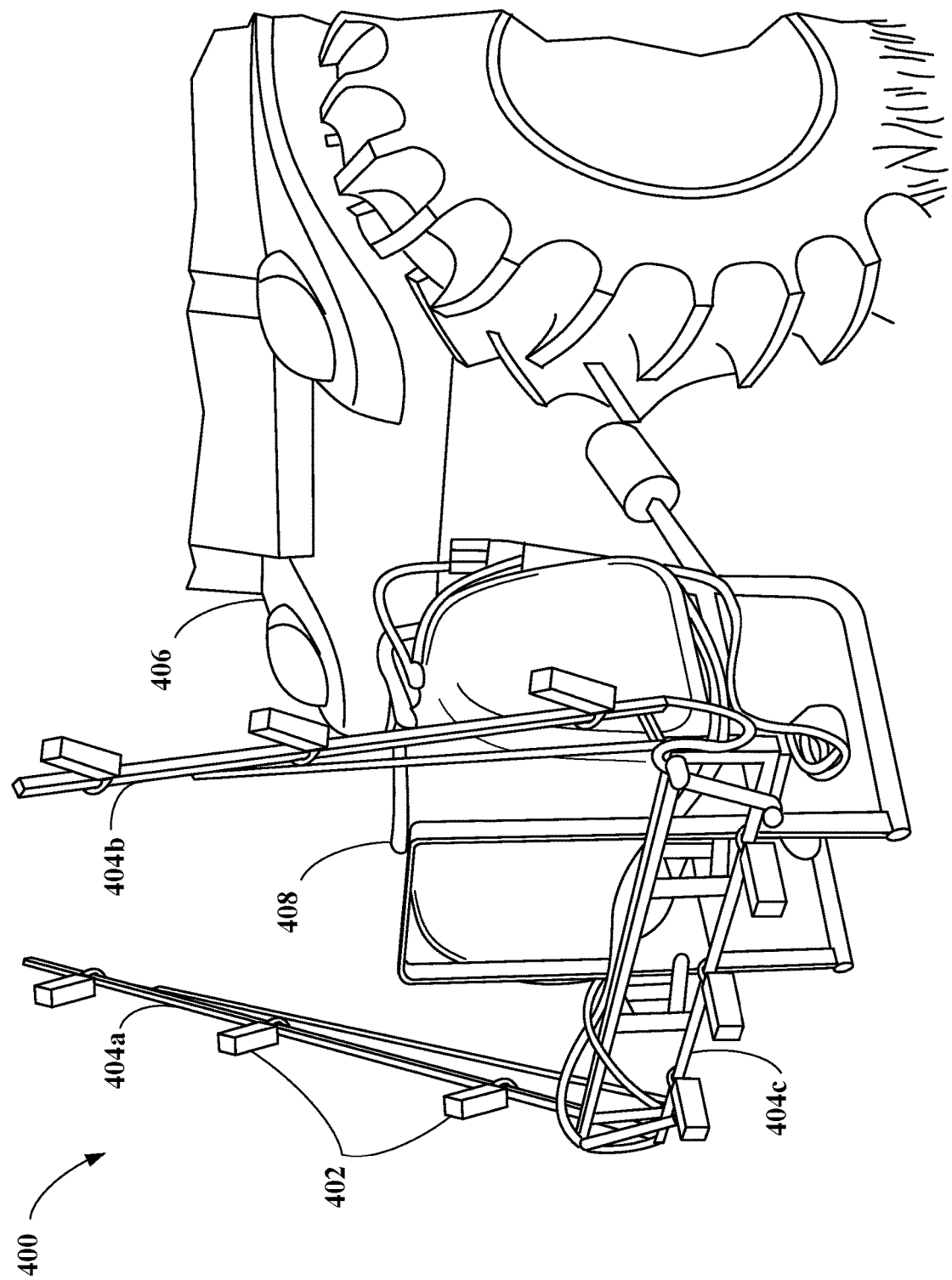

FIGS. 4-5 are simplified drawings showing part of a tractor 406 connected to an implement that includes a herbicide sprayer 400 with a number of plant detection systems 402. The plant detection systems 402 are coupled to arms 404a, 404b and a body 404c of the herbicide sprayer 400. Details of the plant detection systems are not shown in these figures. In the example shown in FIG. 4, the arms 404a, 404b of the herbicide sprayer 400 are extended so that the herbicide sprayer 400 can distribute herbicide over a wide swath of a field or area. In this configuration, the plant detection systems 402 are positioned so that associated radiation modules and photodetector systems face downward for detecting plants on the ground. The radiation modules and photodetector systems are not specifically shown in this example, but at least one radiation module and photodetector system are associated with each plant detection system 402. One or more tanks 408 provide a reservoir of herbicide with hoses 410 providing the herbicide to the plant detection systems 402. A similar sprayer configuration could be used for distributing fertilizer or other chemicals on crops.

In the example shown in FIG. 5, the arms 404a, 404b of the herbicide sprayer 400 are retracted or folded inward. In this configuration, the herbicide sprayer 400 can be transported more easily between fields or jobs. The herbicide sprayer 400 may also be stored with the arms 404a, 404b retracted when not in use. In this configuration, the plant detection systems 402 on the arms 404a, 404b are positioned so that the radiation modules and photodetector systems face outward while the plant detection systems 402 on the body 404c remain facing downward. Depending on the particular implement and how the arms are retracted, some of the plant detection systems may face forward, backward, outward, inward, or even upward when in a retracted position. In this configuration, the radiation modules and photodetector systems are subject to sunlight or other stray radiation. The stray radiation can be focused by the lenses, for example the detector lens, and damage the housing or other components.

Figure 6:
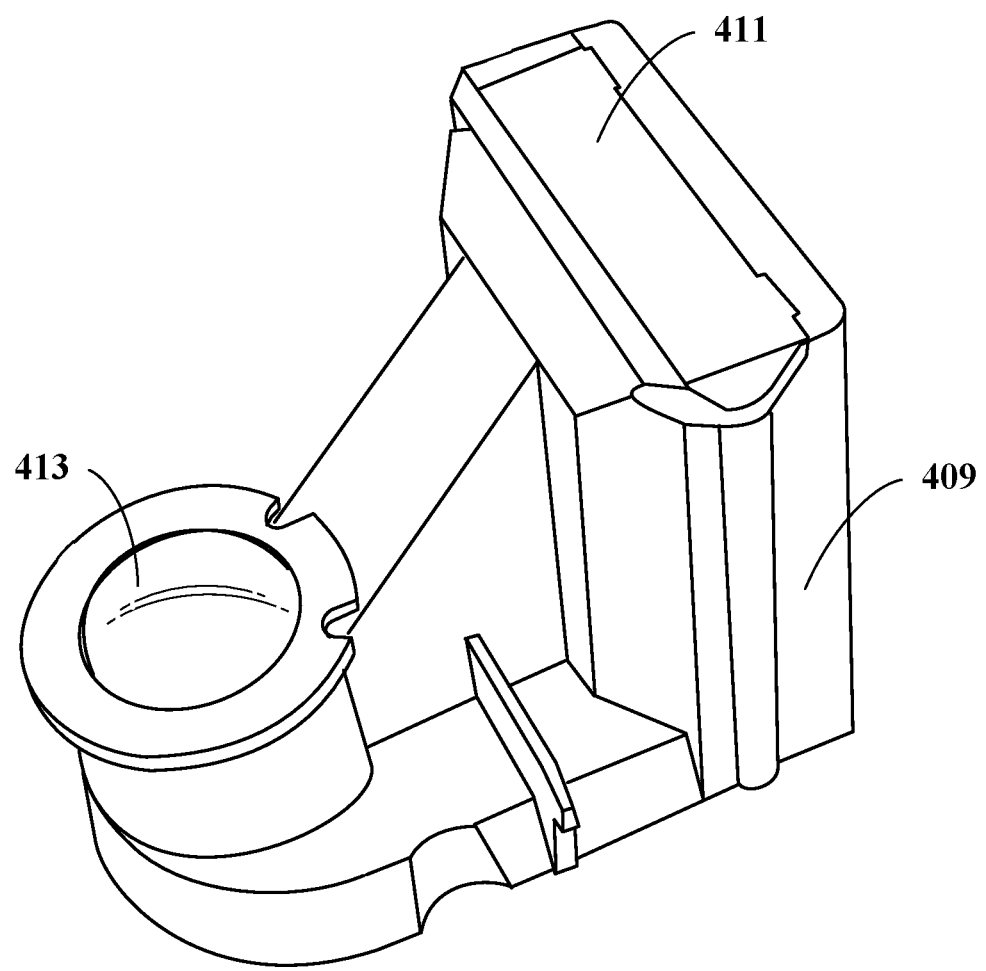
FIGS. 6-7 are simplified drawings of portions of plant detection systems.
Figure 7:
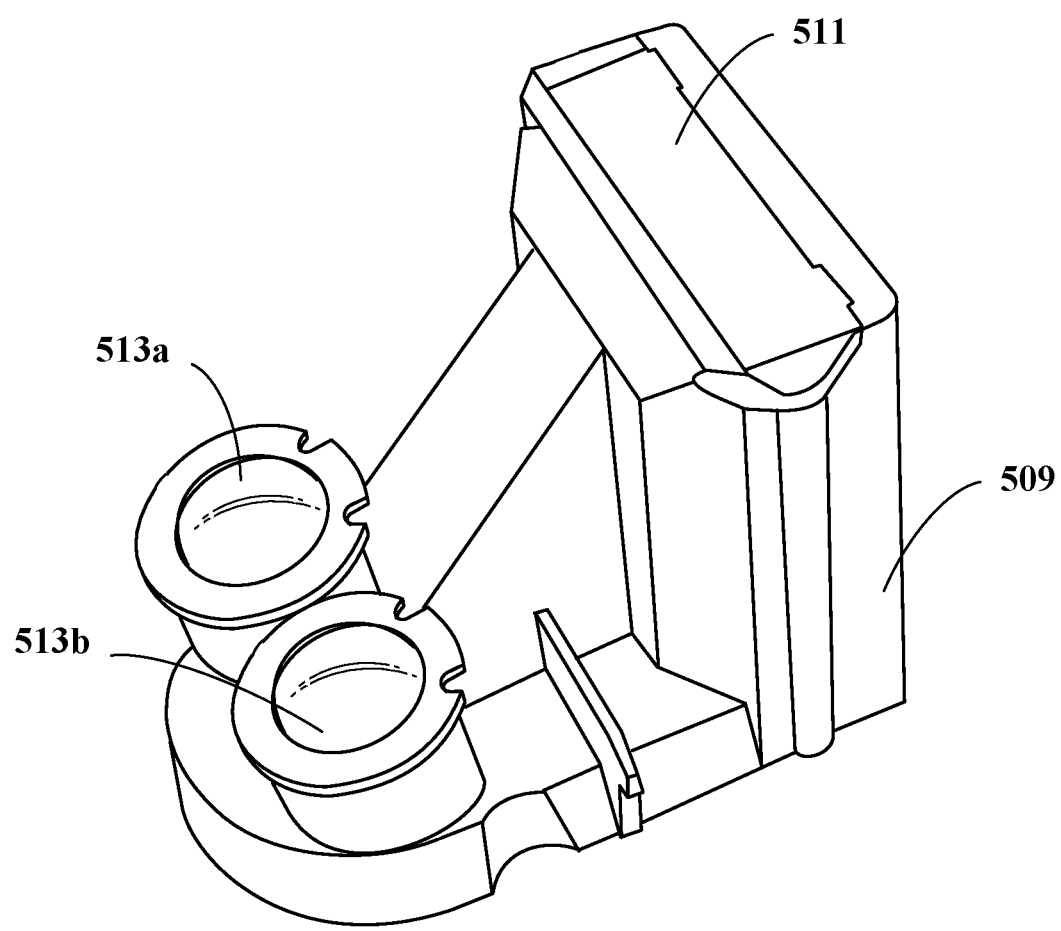

FIGS. 6-7 are simplified drawings of portions of plant detection systems. FIG. 6 provides a perspective view of a housing 409, an emitter lens 411, and a detector lens 413. The emitter lens 411 and/or the detector lens 413 may alternatively be covers that protect underlying lenses and are at least partially transparent to radiation emitted and received by the system.

Diodes within the housing 409 may be configured to emit radiation. The diodes and emitter lens 411 may be part of a radiation module that is configured to emit a radiation beam. One or more photodetectors within the housing 409 may be configured to receive radiation. The one or more photodetectors and detector lens 413 may be part of a photodetector system that is configured to receive reflected radiation and generate electrical signals. The radiation beam is directed toward the ground by the radiation module, and reflected portions of the radiation may be received by the photodetector system.

FIG. 7 provides a perspective view of a housing 509, an emitter lens 511, and detector lenses 513a, 513b. The housing 509 and emitter lens 511 are similar to their corresponding features in FIG. 6 and will not be described separately. This embodiment is different from FIG. 6 in that it includes two detector lenses 513a, 513b. Reflected portions of the light beam are directed by the first detector lens 513a to one or more first photodetectors and by the second detector lens 513b to one or more second photodetectors. A photodetector system with multiple detector lenses and photodetectors may be used to improve sensitivity and functionality of plant detection systems.

Figure 8:
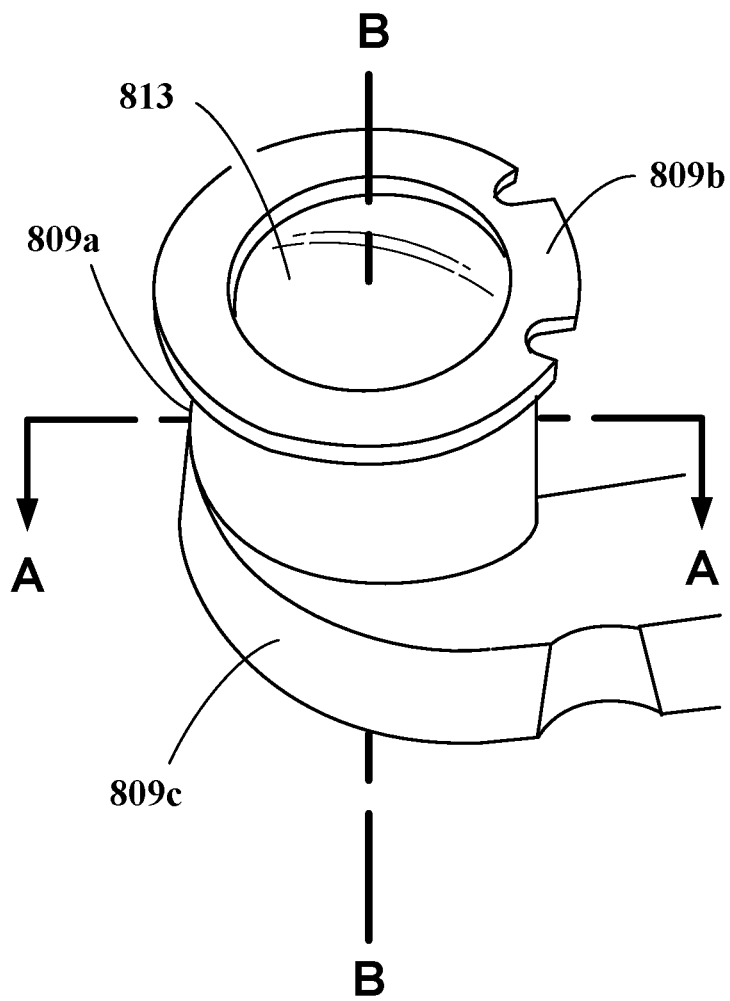
FIG. 8 is a simplified drawing of a portion of a photodetector system.

FIG. 8 is a simplified drawing of a portion of a photodetector system. The photodetector system may be part of a plant detection system as shown in FIGS. 6-7. This figure provides a perspective view of a detector lens 813 and a photodetector housing that includes parts 809a, 809b, 809c. The part 809a of the housing forms a body having a cylindrical shape. The part of the housing 809b extends over edges of the detector lens 813 and helps to hold the detector lens 813 in place. The part of the housing 809c forms a base. One or more photodetectors may be coupled to a substrate, such as a printed circuit board, that is positioned within or under the base. The detector lens 813 is disposed near a top part of the housing, and the one or more photodetectors are disposed near a bottom of the housing (or near opposite ends of the part 809a that has the cylindrical shape).

Figure 9:
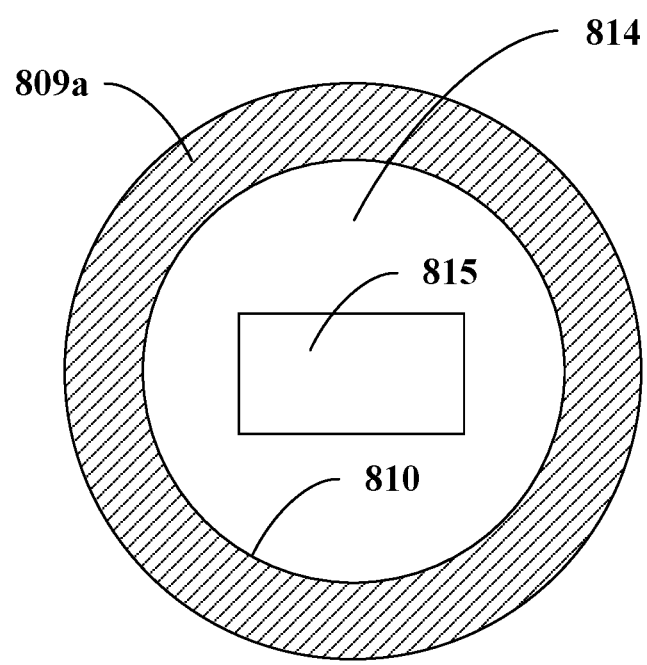
FIG. 9 is a simplified cross-sectional view along line A-A of the portion of the photodetector system shown in FIG. 8 in accordance with an embodiment.

FIG. 9 is a simplified cross-sectional view along line A-A of the portion of the photodetector system shown in FIG. 8 in accordance with an embodiment. This figure shows the part 809a of the photodetector housing that forms a body having a cylindrical shape. Disposed within the body is an aperture plate 814. An aperture 815 extends through a center portion of the aperture plate 814. In this example, the aperture plate 814 extends between sidewalls 810 of the part 809*a* of the photodetector housing. In some embodiments, at least some outer edges of the aperture plate 814 may be adjacent to or abut the sidewalls 810 of the photodetector housing.

The photodetector housing may be made of plastic that is formed by known molding techniques. In some embodiments, the aperture plate 814 may be made of metal or another material that can withstand the stray radiation that may be focused by the detector lens in some situations.

Figure 10:
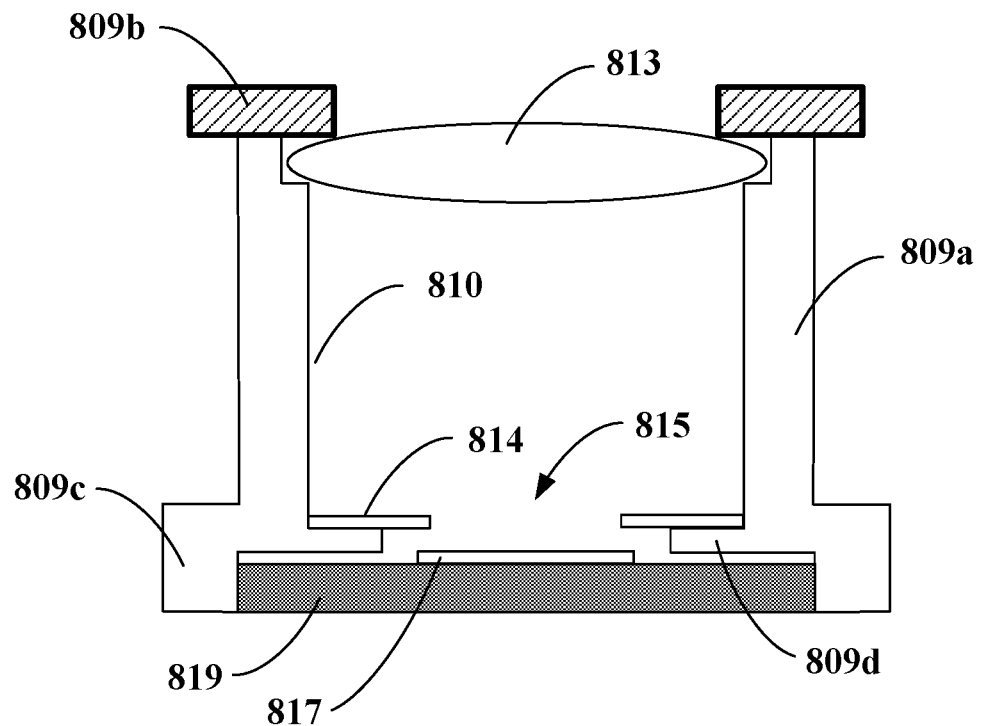
FIGS. 10-12 are simplified cross-sectional views along the axis B-B of the portion of the photodetector system shown in FIG. 8 in accordance with some embodiments.
Figure 11:
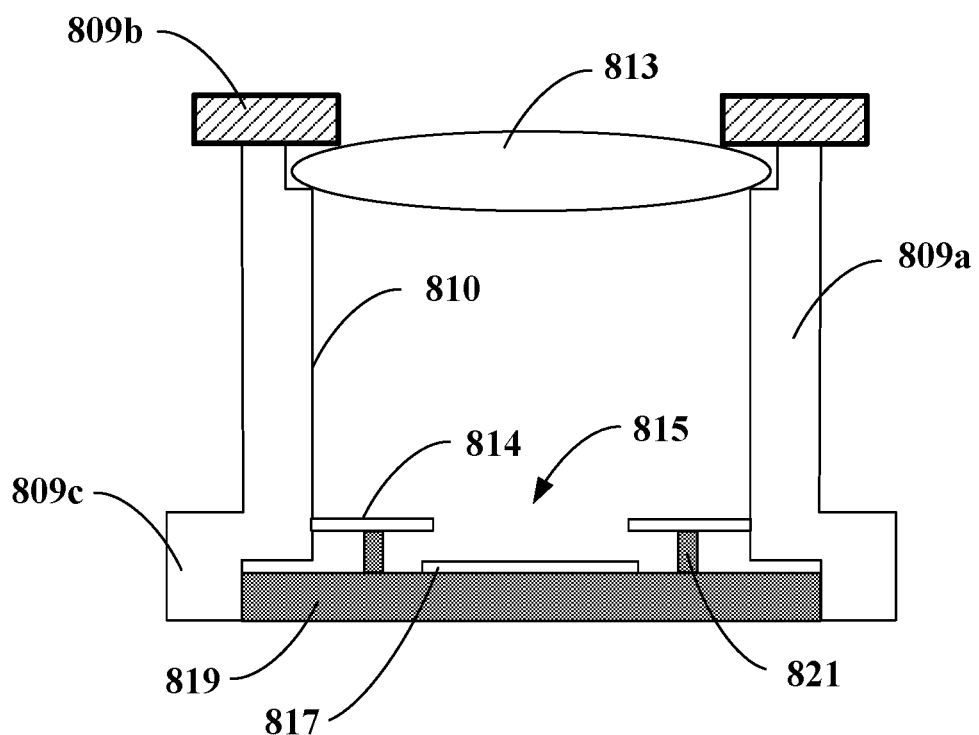
Figure 12:
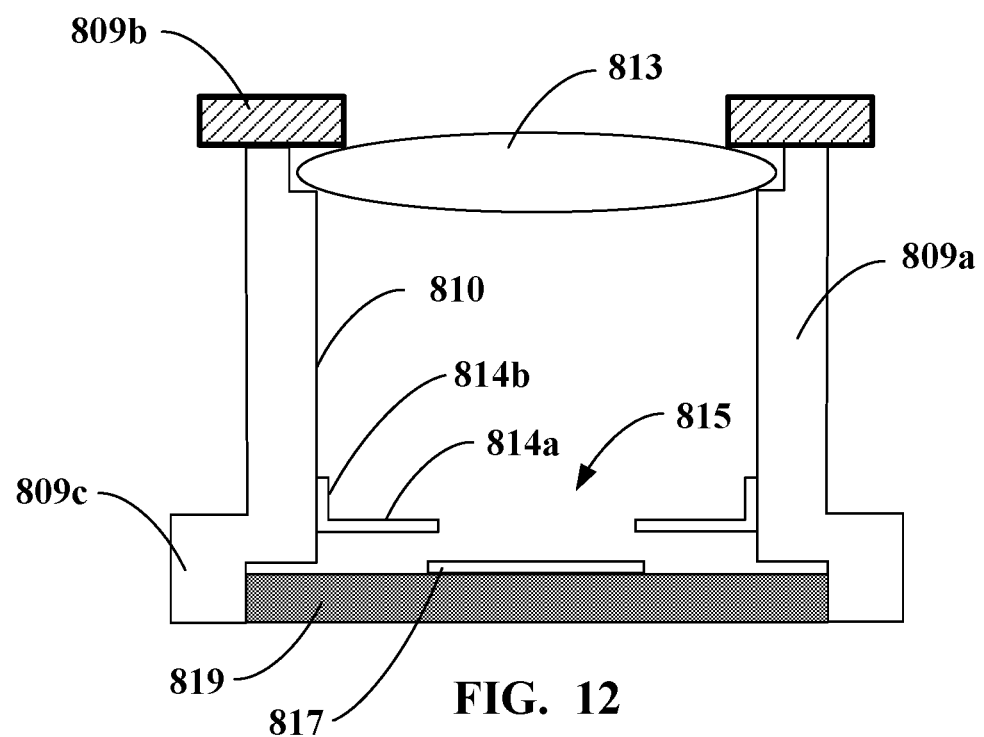

FIGS. 10-12 are simplified cross-sectional views along the axis B-B of the portion of the photodetector system shown in FIG. 8 in accordance with some embodiments. FIG. 10 shows the part 809*a* of the photodetector housing that forms a body and has a cylindrical shape. The detector lens 813 is disposed near one end of the part 809*a* of the photodetector housing, and one or more photodetectors 817 are disposed near an opposite end of the part 809*a* of the photodetector housing (or near opposite ends of the photodetector housing 809*a*, 809*b*, 809*c*). The one or more photodetectors 817 are coupled to substrate 819. The aperture plate 814 is disposed within the photodetector housing between the detector lens 813 and the one or more photodetectors 817. At least a surface of the aperture plate 814 that faces the detector lens 813 is free of plastic.

In this example, the photodetector housing includes ledges 809*d* that extend inward from the sidewalls 810. The aperture plate 814 may be coupled to the ledges 809*d*. At least the outer edges of the aperture plate 814 that are shown in this example extend to the sidewalls 810 of the photodetector housing. In some embodiments, all the outer edges of the aperture plate 814 may extend to and/or abut the sidewalls of the photodetector housing.

The embodiment shown in FIG. 11 is similar to FIG. 10, except the aperture plate 814 is coupled to the substrate 819. The substrate 819 may be a printed circuit board that includes other circuitry for controlling a radiation module and other components of a plant detection system. In this example, the aperture plate 814 is coupled to posts 821 that may be part of or coupled to the substrate 819.

The embodiment shown in FIG. 12 is also similar to FIG. 10, except the aperture plate is coupled to the sidewalls 810 of the photodetector housing. In this example, the aperture plate includes a portion 814*a* that extends approximately orthogonal to the sidewalls 810 of the photodetector housing and a portion 814*b* that extends approximately parallel to the sidewalls 810 of the photodetector housing. The portions 814*b* may extend further up the sidewalls towards the detector lens 813 in some embodiments.

For each of the embodiments shown in FIGS. 10-12, the detector lens 813 and the aperture plate 814 may be configured so that stray radiation received by the detector lens 813 is directed through the aperture 815 in the aperture plate 814 or onto a surface of the aperture plate 814 without being directed onto the sidewalls 810 of the photodetector housing. In some embodiments, the aperture plate 814 may be shaped to prevent the stray radiation that is focused by the detector lens from impinging directly on the sidewalls 810 of the photodetector housing. As an example, the aperture plate 814 may be shaped to cover all areas of the photodetector housing that may be impacted by stray radiation focused by the detector lens 813.

While the present invention has been described in terms of specific embodiments, it should be apparent to those skilled in the art that the scope of the present invention is not limited to the embodiments described herein. For example, features of one or more embodiments of the invention may be combined with one or more features of other embodiments without departing from the scope of the invention. The specification and drawings are, accordingly, to be regarded in an illustrative rather than a restrictive sense. Thus, the scope of the present invention should be determined not with reference to the above description, but should be determined with reference to the appended claims along with their full scope of equivalents.

What is claimed is:

1. A plant detection system, comprising:
   a radiation module configured to emit a beam comprising radiation at a first wavelength and radiation at a second wavelength different from the first wavelength, the radiation at the first wavelength modulated with a first signal having a first phase, and the radiation at the second wavelength modulated with a second signal having a second phase different from the first phase; and
   a photodetector system comprising:
      a photodetector housing having sidewalls forming a cylindrical shape therebetween;
      one or more photodetectors disposed within the photodetector housing, the one or more photodetectors configured to receive reflected portions of the beam and generate an electrical signal based on the reflected portions of the beam;
      a detector lens configured to direct the reflected portions of the beam onto at least one of the one or more photodetectors; and
      an aperture plate disposed within the photodetector housing between the detector lens and the one or more photodetectors, the aperture plate being free of plastic on a surface facing the detector lens and having an aperture extending through a center portion of the aperture plate, the surface of the aperture plate facing the detector lens extending between the sidewalls of the photodetector housing so that at least some outer edges of the aperture plate are adjacent to the sidewalls of the photodetector housing.

2. The system of claim 1 wherein at least some of the outer edges of the aperture plate abut the sidewalls of the photodetector housing.

3. The system of claim 1 wherein the aperture plate is coupled to the sidewalls of the photodetector housing.

4. The system of claim 1 wherein a portion of the aperture plate extends orthogonal to the sidewalls of the photodetector housing and a portion of the aperture plate extends parallel to the sidewalls of the photodetector housing.

5. The system of claim 1 wherein the photodetector housing includes one or more ledges extending inward from the sidewalls, and the aperture plate is coupled to the one or more ledges.

6. The system of claim 1 wherein the one or more photodetectors and the aperture plate are coupled to a substrate.

7. The system of claim 1 wherein the surface of the aperture plate facing the detector lens comprises metal.

8. The system of claim 1 wherein the photodetector housing comprises plastic and the aperture plate comprises metal.

9. The system of claim 1 wherein edges of the aperture form a polygon shape in the aperture plate.

10. A plant detection system, comprising:
    a radiation module configured to emit a beam of radiation; and a photodetector system comprising:
- a photodetector housing having sidewalls forming a cylindrical shape therebetween;
- one or more photodetectors disposed near a first end of the cylindrical shape, the one or more photodetectors configured to receive reflected portions of the beam of radiation and generate an electrical signal based on the received portions of the beam of radiation;
- a detector lens disposed near a second end of the cylindrical shape opposite the first end, the detector lens configured to direct the reflected portions of the beam onto at least one of the one or more photodetectors; and
- an aperture plate disposed within the photodetector housing between the detector lens and the one or more photodetectors and having an aperture extending therethrough, a surface of the aperture plate facing the detector lens extending between the sidewalls of the photodetector housing so that at least some outer edges of the aperture plate are adjacent to the sidewalls of the photodetector housing.

11. The system of claim 10 wherein at least some of the outer edges of the aperture plate abut the sidewalls of the photodetector housing.

12. The system of claim 10 wherein the aperture plate is coupled to the sidewalls of the photodetector housing.

13. The system of claim 10 wherein a portion of the aperture plate extends orthogonal to the sidewalls of the photodetector housing and a portion of the aperture plate extends parallel to the sidewalls of the photodetector housing.

14. The system of claim 10 wherein the photodetector housing includes one or more ledges extending inward from the sidewalls, and the aperture plate is coupled to the one or more ledges.

15. The system of claim 10 wherein the one or more photodetectors and the aperture plate are coupled to a common surface.

16. The system of claim 10 wherein the surface of the aperture plate facing the detector lens comprises metal.

17. A plant detection system, comprising:
- a radiation module configured to emit a beam of radiation; and
- a photodetector system comprising:
  - a photodetector housing having sidewalls extending between a first end of a housing and a second end of the housing;
  - one or more photodetectors disposed near a first end of the housing, the one or more photodetectors configured to receive reflected portions of the beam of radiation and generate an electrical signal based on the received portions of the beam of radiation;
  - a detector lens disposed near a second end of the housing opposite the first end, the detector lens configured to direct the reflected portions of the beam onto at least one of the one or more photodetectors; and
  - an aperture plate disposed within the photodetector housing between the detector lens and the one or more photodetectors and having an aperture extending therethrough, the detector lens and the aperture plate configured so that stray radiation received by the detector lens is directed through the aperture in the aperture plate or onto a surface of the aperture plate without being directed onto the sidewalls of the photodetector housing.

18. The system of claim 17 wherein at least some outer edges of the aperture plate abut the sidewalls of the photodetector housing.

19. The system of claim 17 wherein the aperture plate is coupled to the sidewalls of the photodetector housing.

20. The system of claim 17 wherein the aperture plate is shaped to prevent the stray radiation focused by the detector lens from impinging directly on the sidewalls of the photodetector housing.

* * * * *